US008533508B2

(12) United States Patent
Chang et al.

(10) Patent No.: US 8,533,508 B2
(45) Date of Patent: Sep. 10, 2013

(54) APPARATUS AND METHOD FOR REDUCING THE STANDBY POWER CONSUMPTION OF A DISPLAY, AND DISPLAY WITH LOW STANDBY POWER CONSUMPTION

(75) Inventors: Kuang-Fu Chang, Kaohsiung (TW); Yu-Ming Chen, Hsinchu (TW); Pei-Lun Huang, Zhubei (TW)

(73) Assignee: Richpower Microelectronics Corporation, Grand Cayman (KY)

( * ) Notice: Subject to any disclaimer, the term of this patent is extended or adjusted under 35 U.S.C. 154(b) by 244 days.

(21) Appl. No.: 12/838,667

(22) Filed: Jul. 19, 2010

(65) Prior Publication Data
US 2011/0022867 A1    Jan. 27, 2011

(30) Foreign Application Priority Data
Jul. 21, 2009 (TW) .............................. 98124619 A

(51) Int. Cl.
| G06F 1/26 | (2006.01) |
| G06F 1/00 | (2006.01) |
| G06F 3/038 | (2013.01) |
| G05F 1/00 | (2006.01) |
| H02M 3/156 | (2006.01) |
| H02M 1/12 | (2006.01) |
| H01F 17/00 | (2006.01) |
| G09G 3/18 | (2006.01) |

(52) U.S. Cl.
USPC ........... 713/320; 713/300; 713/323; 323/221; 323/282; 323/351; 323/355; 345/52; 345/211; 363/41

(58) Field of Classification Search
USPC ................. 713/300, 320, 323; 323/221, 282, 323/351, 355; 363/41; 345/52, 211
See application file for complete search history.

(56) References Cited

U.S. PATENT DOCUMENTS

| 6,362,980 | B1 * | 3/2002 | Ohashi et al. ............... 363/21.01 |
| 6,549,429 | B2 * | 4/2003 | Konno ........................ 363/21.04 |
| 7,199,649 | B2 * | 4/2007 | Noguchi ....................... 327/544 |
| 7,579,784 | B2 * | 8/2009 | Araki et al. ................ 315/209 R |
| 8,040,705 | B2 * | 10/2011 | Mayell ............................ 363/97 |
| 2009/0097289 | A1 * | 4/2009 | Schetters ........................ 363/84 |

* cited by examiner

*Primary Examiner* — Stefan Stoynov
(74) *Attorney, Agent, or Firm* — Muncy, Geissler, Olds & Lowe, PLLC

(57) ABSTRACT

A display includes a power supply system using a power controller to switch a power switch to control power delivery, and an image scalar receiving a supply voltage and a supply current from the power supply system. An apparatus and method are proposed to determine a control signal in a standby mode by monitoring the supply voltage or the supply current, to wake up or turn off the power controller to reduce the switching times of the power switch in the standby mode, thereby reducing the switching loss of the power switch and the standby power consumption of the display.

20 Claims, 5 Drawing Sheets

APPARATUS AND METHOD FOR REDUCING THE STANDBY POWER CONSUMPTION OF A DISPLAY, AND DISPLAY WITH LOW STANDBY POWER CONSUMPTION

FIELD OF THE INVENTION

The present invention is related generally to the power management of a display and, more particularly, to apparatus and method for reducing the standby power consumption of a display.

BACKGROUND OF THE INVENTION

Recently, due to shortage of energy sources and with environmental awareness on the rise, various energy saving functions attract more and more attention in applications of power supplies, of which the standby power consumption is one of the key factors. As shown in FIG. 1, a display 10 includes a power supply system 12 to provide the voltage needed by the internal components of the display 10, and an image scalar 14 to control the size of an image displayed. The power supply system 12 uses a flyback voltage converter 16 to convert an input voltage Vin to an output voltage Vo, and the voltage Vs supplied to the image scalar 14 is generated from the voltage Vo by a low-dropout (LDO) regulator 18. In the flyback voltage converter 16, a transformer Tx has a primary coil Lp connected between the power input end Vin and a power switch Qsw, and a secondary coil Ls connected between a diode Do and a ground end GND, a power controller 20 provides a pulse width modulation (PWM) signal Vgs from a pin GATE to switch the power switch Qsw and thereby control the power delivery of the transformer Tx, the transformer Tx further includes an auxiliary coil Laux connected between a ground end GND and a diode Daux to supply a current Iaux for charging a capacitor Cvdd and thereby providing electricity to a power pin VDD of the power controller 20, a photo-coupler 22 and a shunt regulator 24 are used to generate a feedback signal FB to feed back the output information of the flyback voltage converter 16 to a pin COMP of the power controller 20, a current sense resistor Rcs is connected in series with the power switch Qsw to detect the current in the primary coil Lp to generate a current sense signal VCS injected to a current sense pin CS of the power controller 20, and according to the feedback signal FB and the current sense signal VCS, the power controller 20 modulates the duty of the power switch Qsw to regulate the output voltage Vo at a certain value and control the output power of the flyback voltage converter 16.

FIG. 2 is a waveform diagram for demonstrating a conventional control method of the power controller 20. As shown by the waveform 26, the output current Iload of the flyback voltage converter 16 is higher in a normal mode than in a standby mode. In the normal mode, to support a heavy loading, the power switch Qsw is switched by a high-frequency PWM signal Vgs. In the standby mode, however, the power controller 20 operates in a pulse skipping mode, in which the power switch Qsw is switched less frequently because the number of pulses is reduced, and the lighter the loading is, the more pulses are skipped. Nevertheless, the use of electricity by the image scalar 14 in the standby mode was never effectively adjusted. As shown by the waveform 28, the supply voltage Vs of the image scalar 14 remains constant in both the normal and standby modes. Therefore, even after the display 10 enters the standby mode, the image scalar 14 and the power controller 20 still operate as in the normal mode and accordingly, cause considerable power consumption. If the image scalar 14 is turned off for power saving, the display 10 will also enter an OFF mode and thus leave the standby mode.

Hence, it is desired an apparatus and method for reducing the standby power consumption of a display while maintaining normal operation of an image scalar of the display during the standby mode.

BRIEF SUMMARY OF THE INVENTION

An object of the present invention is to provide an apparatus and method for reducing the standby power consumption of a display.

Another object of the present invention is to provide a display with low standby power consumption.

According to the present invention, a display includes a power supply system having a power controller to switch a power switch to control the power delivery, and an image scalar connected to the power supply system to receive a supply voltage therefrom. An apparatus for reducing the standby power consumption of the display includes a power monitor circuit to monitor the supply voltage in a standby mode under control of a mode signal to generate a control signal accordingly to enable or disable the power controller. A method for reducing the standby power consumption of the display includes monitoring the supply voltage in a standby mode under control of a mode signal, generating a control signal according to the variation of the supply voltage, and enabling or disabling the power controller with the control signal.

When disabled, the power controller stops switching the power switch and as a result, the switching loss and power consumption are both reduced. By enabling the power controller in the standby mode, the supply voltage is maintained within a range sufficient for sustaining normal operation of the image scalar.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
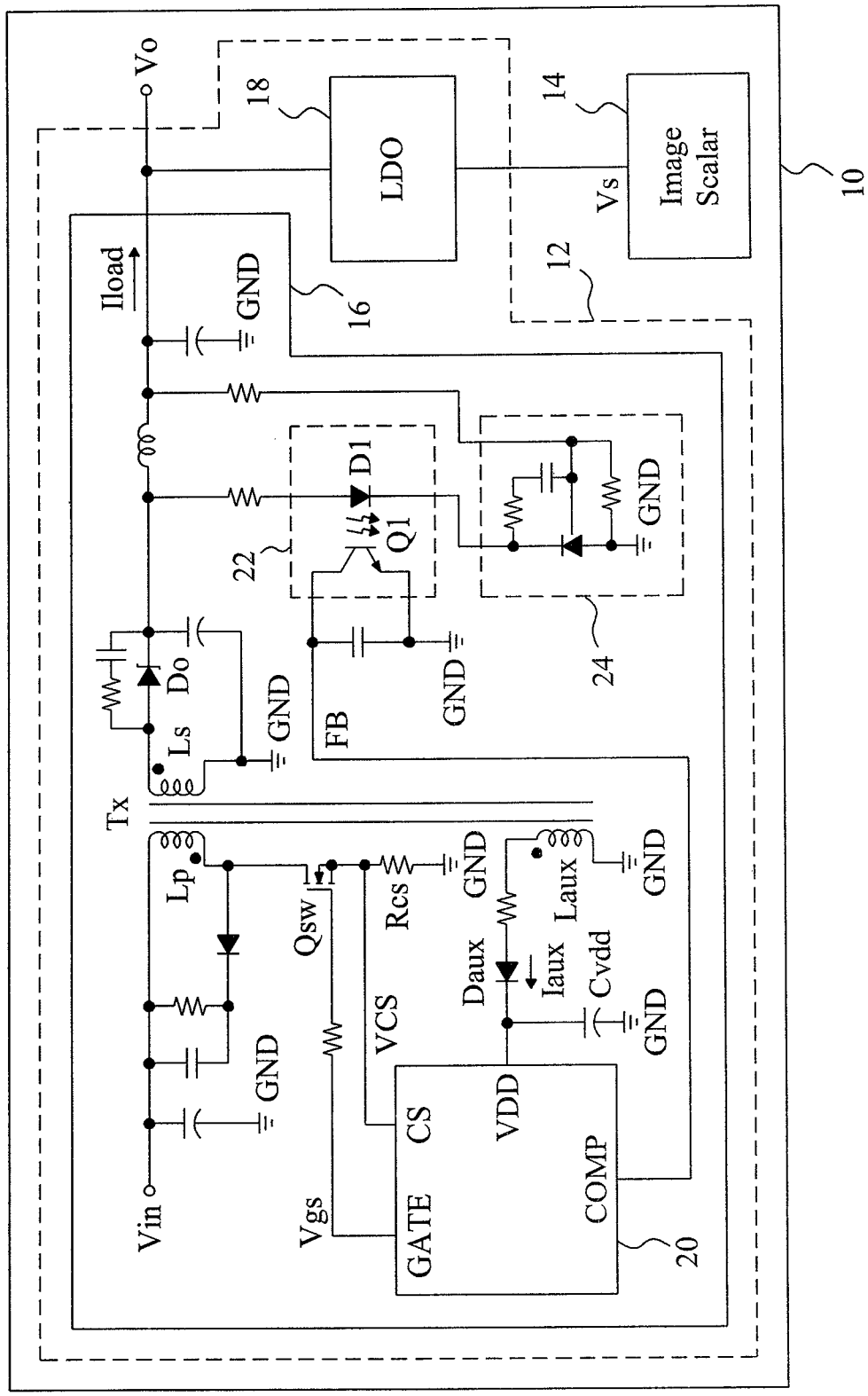
FIG. 1 is a circuit diagram of a conventional display.
Figure 2:
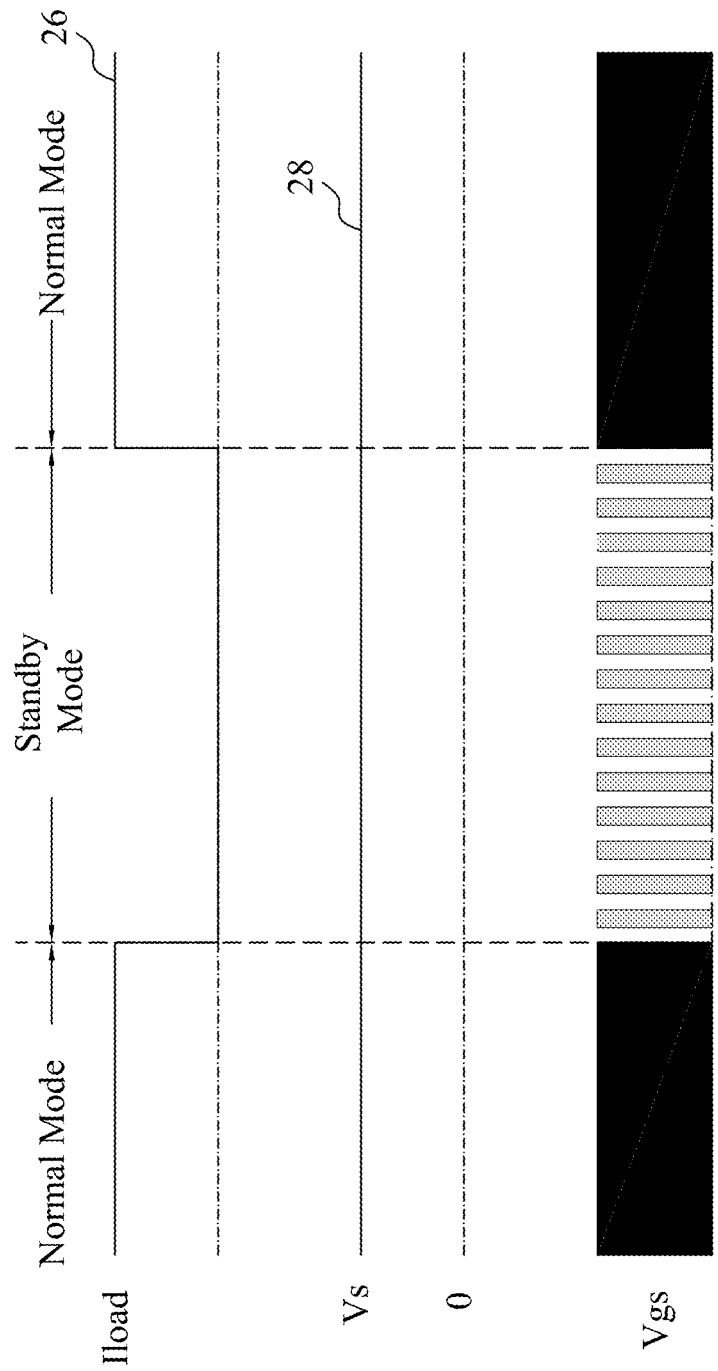
FIG. 2 is a waveform diagram of the display shown in FIG. 1.
Figure 3:
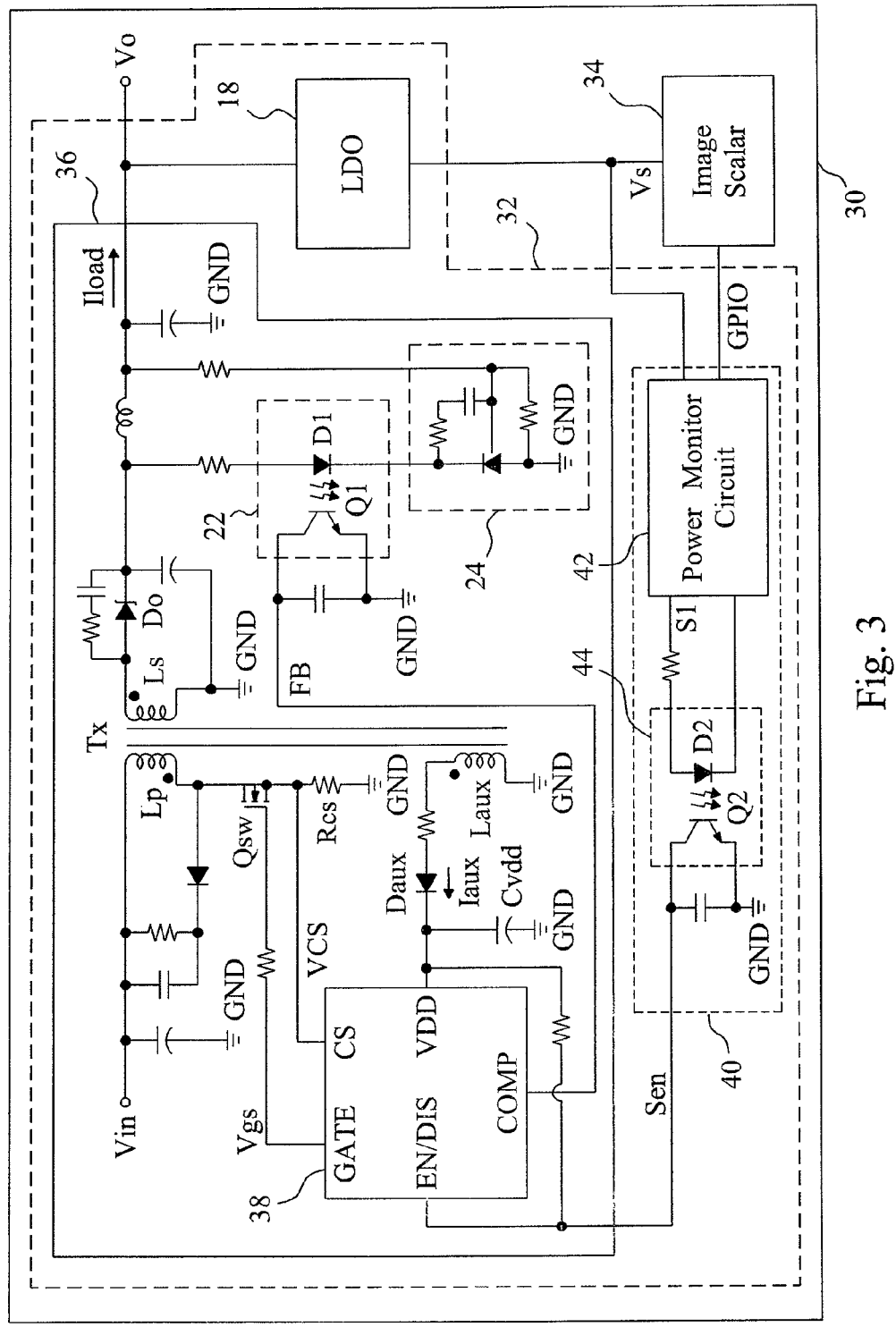
FIG. 3 is a circuit diagram of a display according to the present invention.

FIG. 3 is a circuit diagram of an embodiment according to the present invention, in which a display 30 includes a power supply system 32 to provide the voltage needed by the internal components of the display 30, and an image scalar 34 to control the size of an image displayed. The power supply system 32 includes a flyback voltage converter 36 using a power controller 38 to switch a power switch Qsw to convert an input voltage Vin to an output voltage Vo, and an LDO 18 to generate a voltage Vs from the voltage Vo to supply to the image scalar 34. The power supply system 32 further includes an apparatus 40 to improve the efficiency of the display 30 in a standby mode, which has a power monitor circuit 42 connected to the image scalar 34, and a photocoupler 44 connected to the power controller 38. The power monitor circuit 42 receives a mode signal GPIO from the image scalar 34 and monitors the voltage or current at the power pin Vs of the image scalar 34 to generate a control signal S1 accordingly. The photocoupler 44 converts the control signal S1 to an enable signal Sen fed back to an enable pin EN/DIS of the power controller 38. When the display 30 operates in a normal mode, the mode signal GPIO is at a first state, i.e., at a low level, and thus the power monitor circuit 42 keeps the control signal S1 at low, so that no current flows through the light-emitting diode D2 in the photocoupler 44, the transistor Q2 is off, and the enable signal Sen is high, by which the power controller 38 continues switching the power switch Qsw as conventionally. Once the display 30 enters a standby mode, the mode signal GPIO is at a second state, i.e., at a high level, by which the power monitor circuit 42 will determine the level of the control signal S1 according to the voltage Vs, to pull the enable signal Sen to high or to low, thereby enabling or disabling the power controller 38. While the power controller 38 is disabled, the power controller 38 stops switching the power switch Qsw, and thus the switching loss and power consumption are both reduced and the efficiency is improved. In the standby mode, by using the apparatus 40 to disable or enable the power controller 38, and thereby to stop or resume switching the power switch Qsw, the voltage Vs is decreased or increased within a range not exceeding the range of operating voltage of the image scalar 34. Namely, in the standby mode, it provides only enough power for the image scalar 34 to sustain normal operation, and the voltage Vs will not be kept at a heavy loading state. In this embodiment, the mode signal GPIO is provided by the image scalar 34; while in other embodiments, the mode signal GPIO may be provided by the power controller 38. Furthermore, the power monitor circuit 42 and the image scalar 34 may be integrated in a same integrated circuit.

Figure 4:
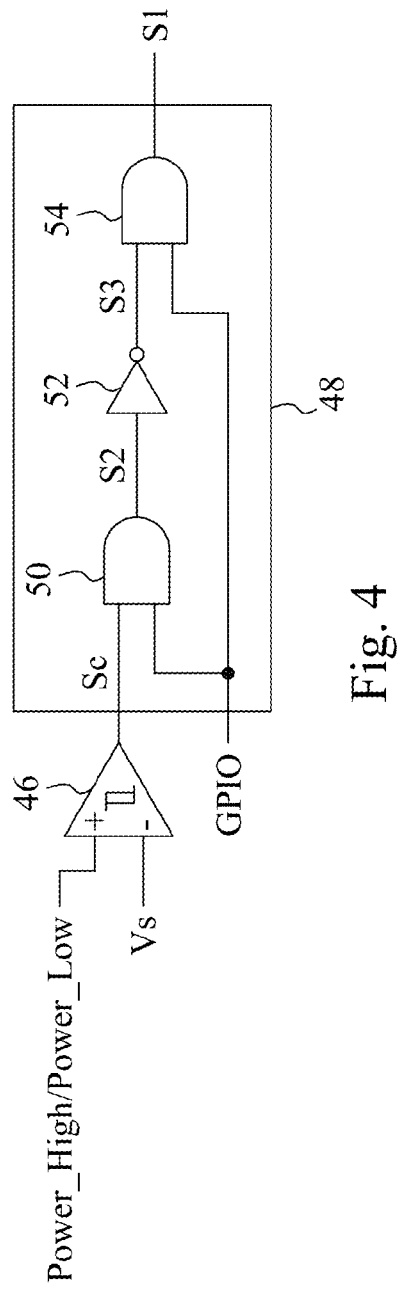
FIG. 4 is a circuit diagram of a first embodiment for the power monitor circuit shown in FIG. 3.

FIG. 4 is a circuit diagram of a first embodiment for the power monitor circuit 42, which includes a hysteresis comparator 46 and a logic circuit 48. An upper threshold value Power_High and a lower threshold value Power_Low are provided for the input of the hysteresis comparator 46 to define the upper limit and the lower limit of a hysteresis band, respectively. The voltage Vs is compared with the upper and lower limits to generate a comparison signal Sc. In the logic circuit 48, an AND gate generates a first signal S2 according to the comparison signal Sc and the mode signal GPIO, an inverter 52 is connected to the AND gate 50 to generate a second signal S3 by inverting the first signal S2, and an AND gate 54 generates the control signal S1 according to the mode signal GPIO and the second signal S3.

Figure 5:
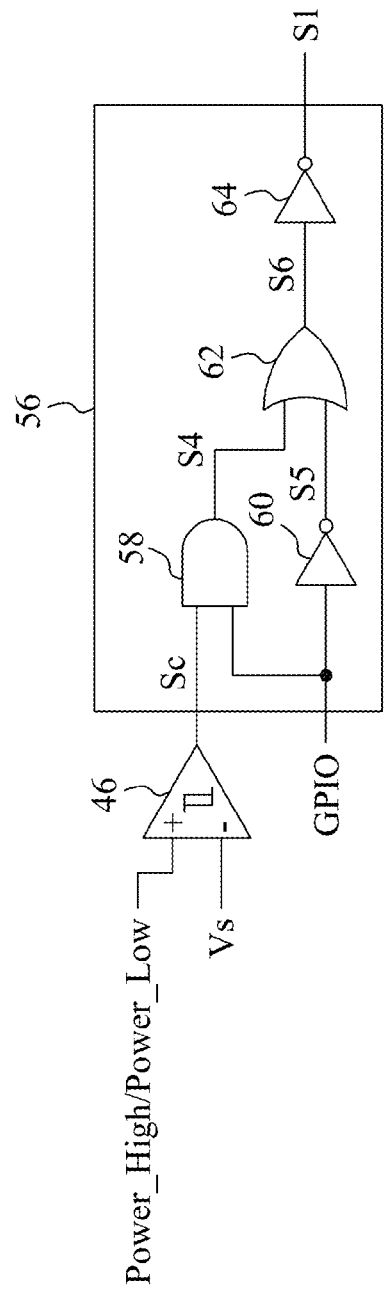
FIG. 5 is a circuit diagram of a second embodiment for the power monitor circuit shown in FIG. 3.

FIG. 5 is a circuit diagram of a second embodiment for the power monitor circuit 42, in which the hysteresis comparator 46 is identical to its counterpart in the embodiment shown in FIG. 4, and a logic circuit 56 includes an AND gate 58 to generate a first signal S4 according to the comparison signal Sc and the mode signal GPIO, an inverter 60 to generate a second signal S5 by inverting the mode signal GPIO, an OR gate 62 connected to the AND gate 58 and the inverter 60 to generate a third signal S6 according to the first signal S4 and the second signal S5, and an inverter 64 connected to the OR gate 62 to generate the control signal S1 by inverting the third signal S6. The logic circuit 56 of FIG. 5 generates the same operation result as the logic circuit 48 of FIG. 4. A person skilled in the art can design other logic circuits based on the teachings of the foregoing embodiments.

Figure 6:
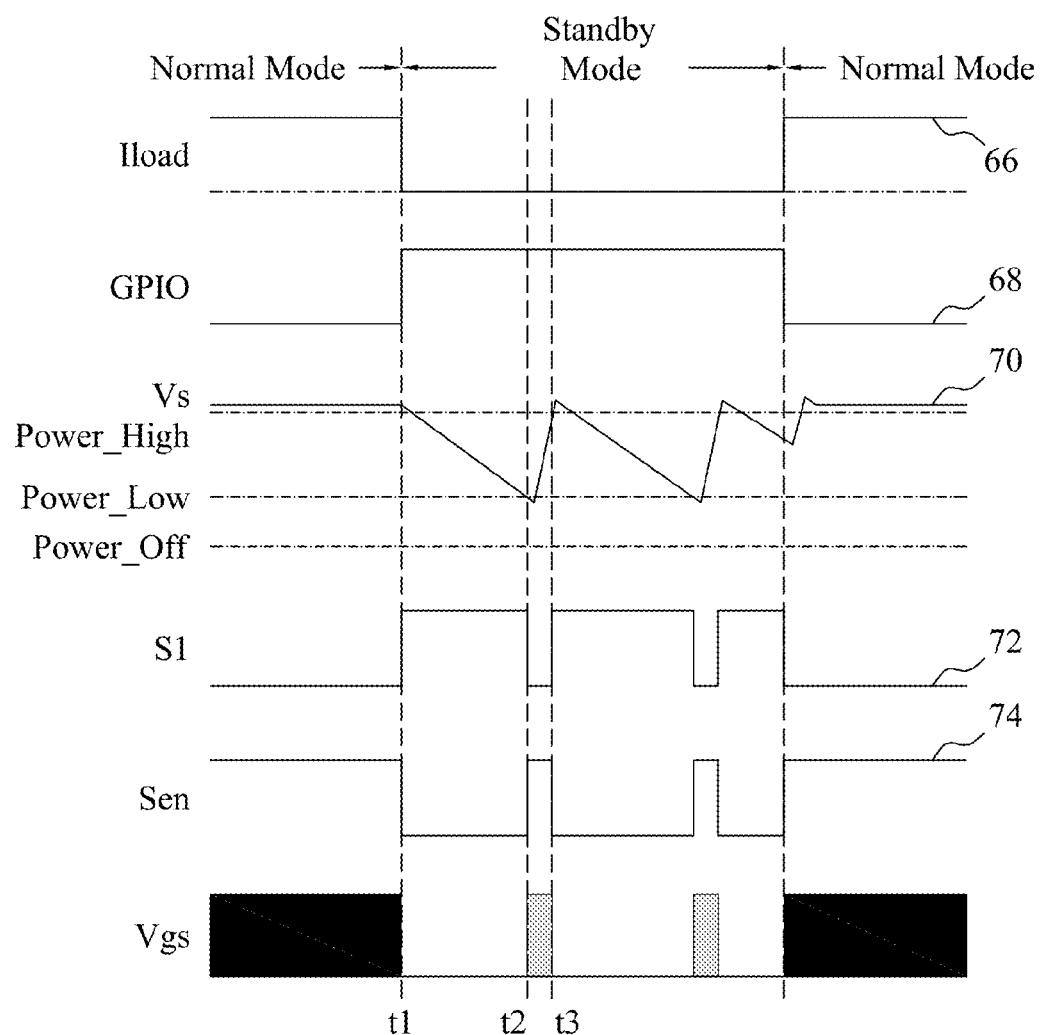
FIG. 6 is a waveform diagram of the display shown in FIG. 3 when using the power monitor circuit shown in FIG. 4.

FIG. 6 is a waveform diagram of the display 30 employing the power monitor circuit 42 of FIG. 4. In the normal mode, the mode signal GPIO is low and as a result, the control signal S1 remains low, the enable signal Sen remains high, and the power controller 38 operates normally as conventionally. Once the display 30 enters the standby mode, as indicated at time t1, the mode signal GPIO transits to high, and at this time, the voltage Vs is higher than the upper threshold value Power_High, so that the control signal S1 transits to high and brings the enable signal Sen switched to low, and consequently, the power controller 38 is disabled and stops switching the power switch Qsw, causing the output voltage Vo of the flyback voltage converter 36, and the supply voltage Vs of the image scalar 34, decreasing gradually. When the voltage Vs becomes lower than the lower threshold value Power_Low, as indicated at time t2, the comparison signal Sc transits to high, the control signal S1 switches to low and brings the enable signal Sen switched to high, and the power controller 38 is enabled to resume switching the power switch Qsw. In consequence, the supply voltage Vs of the image scalar 34 rises with the increasing output voltage Vo of the flyback voltage converter 36. When the voltage Vs rises above the upper threshold value Power_High, as indicated at time t3, the comparison signal Sc returns to low and brings the control signal S1 back to high and the enable signal Sen back to low. Thus, the power controller 38 is disabled and stops switching the power switch Qsw, so that the supply voltage Vs of the image scalar 34 decreases with the decreasing output voltage Vo of the voltage converter 36. The aforesaid process is repeated until the display 30 returns to the normal mode. As shown in FIG. 6, in the standby mode, the voltage Vs will vary between the upper threshold value Power_High and the lower threshold value Power_Low, and the PWM signal Vgs will be turned off for an extended period of time to reduce the switching loss. However, since the lower threshold value Power_Low is higher than the turn-off threshold value Power-Off of the image scalar 34, the image scalar 34 will still operate normally. In the standby mode, the decreasing slope of the voltage Vs is related to the loading Iload of the flyback voltage converter 36. More specifically, the lighter the loading is, the more slowly the voltage Vs decreases, the longer the power controller 38 is disabled, the lower the power consumption is.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An apparatus for reducing the standby power consumption of a display including a power supply system using a power controller to switch a power switch to control power delivery, and an image scalar receiving a supply voltage from the power supply system, the apparatus comprising:
   a power monitor circuit connected to the image scalar, operative to monitor the supply voltage in a standby mode under control of a mode signal to generate a control signal accordingly; and
   a photocoupler connected to the power monitor circuit, for converting the control signal to an enable signal to enable or disable the power controller to maintain the supply voltage within a range of an operating voltage of the image scalar in the standby mode.

2. The apparatus of claim 1, wherein the power monitor circuit keeps the enable signal enabling the power controller in a normal mode.

3. The apparatus of claim 1, wherein the power monitor circuit comprises:
   a hysteresis comparator having an upper threshold value and a lower threshold value to be compared with the supply voltage to generate a comparison signal; and
   a logic circuit connected to the hysteresis comparator, operative to generate the control signal according to the comparison signal and the mode signal.

4. The apparatus of claim 3, wherein the logic circuit comprises:
   a first AND gate connected to the hysteresis comparator, for generating a first signal according to the comparison signal and the mode signal;
   an inverter connected to the first AND gate, for generating a second signal by inverting the first signal; and
   a second AND gate connected to the inverter, for generating the control signal according to the mode signal and the second signal.

5. The apparatus of claim 3, wherein the logic circuit comprises:
   an AND gate connected to the hysteresis comparator, for generating a first signal according to the comparison signal and the mode signal;
   a first inverter for generating a second signal by inverting the mode signal;
   an OR gate connected to the AND gate and the first inverter, for generating a third signal according to the first signal and the second signal; and
   a second inverter connected to the OR gate, for generating the control signal by inverting the third signal.

6. The apparatus of claim 1, wherein the mode signal is provided by the image scalar.

7. The apparatus of claim 1, wherein the mode signal is provided by the power controller.

8. A method for reducing the standby power consumption of a display including a power supply system using a power controller to switch a power switch to control power delivery, and an image scalar receiving a supply voltage from the power supply system, the method comprising the steps of:
   (A) monitoring the supply voltage in a standby mode under control of a mode signal;
   (B) generating a control signal according to variation of the supply voltage; and
   (C) enabling or disabling the power controller with the control signal to maintain the supply voltage within a range of an operating voltage of the image scalar in the standby mode.

9. The method of claim 8, wherein the step (B) comprises the step of hysteretically comparing the supply voltage with an upper threshold value and a lower threshold value to determine the control signal.

10. The method of claim 9, wherein the control signal enables the power controller when the supply voltage falls below the lower threshold value.

11. The method of claim 9, wherein the control signal disables the power controller when the supply voltage rises above the upper threshold value.

12. The method of claim 8, further comprising the step of switching the mode signal from a first state to a second state upon entering the standby mode.

13. The method of claim 8, further comprising the step of generating the mode signal by the image scalar.

14. The method of claim 8, further comprising the step of generating the mode signal by the power controller.

15. A display with low standby power consumption, comprising:
   a power supply system having a power controller for switching a power switch to control power delivery;
   an image scalar connected to the power supply system and receiving a supply voltage therefrom; and
   a power monitor circuit connected to the image scalar, operative to monitor the supply voltage in a standby mode under control of a mode signal to generate a control signal accordingly, to enable or disable the power controller to maintain the supply voltage within a range of an operating voltage of the image scalar in the standby mode.

16. The display of claim 15, wherein the power monitor circuit keeps enabling the power controller in a normal mode.

17. The display of claim 15, further comprising a photocoupler connected to the power monitor circuit, for converting the control signal to an enable signal to enable or disable the power controller.

18. The display of claim 15, wherein the power monitor circuit comprises a hysteresis comparator for comparing the supply voltage with an upper threshold value and a lower threshold value to determine the control signal.

19. The display of claim 18, wherein the control signal enables the power controller when the supply voltage falls below the lower threshold value in the standby mode.

20. The display of claim 18, wherein the control signal disables the power controller when the supply voltage rises above the upper threshold value in the standby mode.

* * * * *